(12) United States Patent
Morgan et al.

(10) Patent No.: US 9,377,247 B2
(45) Date of Patent: Jun. 28, 2016

(54) INTEGRATION OF AN ENERGY STORAGE DEVICE WITH A SEPARATE THERMAL PROCESS

(75) Inventors: Robert Morgan, West Sussex (GB); Stephen Gareth Brett, Reading (GB)

(73) Assignee: Highview Enterprises Limited, London (GB)

( * ) Notice: Subject to any disclaimer, the term of this patent is extended or adjusted under 35 U.S.C. 154(b) by 692 days.

(21) Appl. No.: 13/816,195

(22) PCT Filed: Aug. 12, 2011

(86) PCT No.: PCT/GB2011/001215
§ 371 (c)(1),
(2), (4) Date: May 17, 2013

(87) PCT Pub. No.: WO2012/020234
PCT Pub. Date: Feb. 16, 2012

(65) Prior Publication Data
US 2013/0284394 A1     Oct. 31, 2013

(30) Foreign Application Priority Data

Aug. 12, 2010 (GB) .................................. 1013578.8
Mar. 15, 2011 (GB) .................................. 1104387.4

(51) Int. Cl.
*F03G 6/00* (2006.01)
*F01K 1/00* (2006.01)
(Continued)

(52) U.S. Cl.
CPC ............... *F28D 17/00* (2013.01); *F28D 20/00* (2013.01); *F28D 20/0056* (2013.01); *F28D 20/026* (2013.01); *F28D 20/028* (2013.01); *F28F 27/02* (2013.01); *F28D 2020/006* (2013.01); *F28D 2020/0082* (2013.01);
(Continued)

(58) Field of Classification Search
CPC ..... F28D 17/00; F28D 20/0056; F28D 20/00; F28D 20/028; F28D 20/026; F28D 2020/006; F28D 2020/0082; F28D 2021/0033; F28F 27/02; Y02E 60/145; Y02E 60/142
USPC .................................. 60/641.8–641.15, 659
See application file for complete search history.

(56) References Cited

U.S. PATENT DOCUMENTS

| 4,173,125 A | 11/1979 | Bradshaw |
| 7,877,999 B2 * | 2/2011 | Nuel ....................... F02G 1/043 60/398 |

(Continued)

FOREIGN PATENT DOCUMENTS

| EP | 0006211 A1 | 1/1980 |
| FR | 2665945 A1 | 2/1992 |

(Continued)

OTHER PUBLICATIONS

PCT International Search Report in corresponding International Application No. PCT/GB2011/001215, dated Jul. 2, 2012 (4 pages).
(Continued)

*Primary Examiner* — Hoang Nguyen
(74) *Attorney, Agent, or Firm* — Thomas B. Ryan; Harter Secrest & Emery LLP

(57) ABSTRACT

The present invention relates to methods of integrating one or more thermal processes with one another, wherein the thermal processes to be integrated have different supply and demand criteria for thermal energy. The method involves the use of one or more thermal stores.

34 Claims, 8 Drawing Sheets

(51) Int. Cl.
*F28D 17/00* (2006.01)
*F28D 20/00* (2006.01)
*F28D 20/02* (2006.01)
*F28F 27/02* (2006.01)
*F28D 21/00* (2006.01)

(52) U.S. Cl.
CPC ...... *F28D 2021/0033* (2013.01); *Y02E 60/142* (2013.01); *Y02E 60/145* (2013.01)

(56) References Cited

U.S. PATENT DOCUMENTS

| | | | |
|---|---|---|---|
| 8,464,535 B2* | 6/2013 | White | F01K 3/08 165/10 |
| 2009/0194257 A1* | 8/2009 | Niu | F28D 15/00 165/104.17 |
| 2010/0019718 A1* | 1/2010 | Salasoo | B60L 3/0046 320/103 |
| 2010/0089391 A1* | 4/2010 | Addie | F24J 2/34 126/617 |
| 2010/0176602 A1 | 7/2010 | Shinnar | |
| 2010/0196602 A1 | 8/2010 | Koyano et al. | |

FOREIGN PATENT DOCUMENTS

| | | |
|---|---|---|
| JP | 02-071055 A | 3/1990 |
| WO | 2012-020234 A2 | 2/2012 |

OTHER PUBLICATIONS

PCT Written Opinion of the international Searching Authority in corresponding International Application No. PCT/GB2011/001215, dated Jul. 2, 2012 (5 pages).

Chen et al: "Progress in electrical energy storage system: A critical review" (pp. 291-312) Progress in National Science, Science Press, Beijing, CN, vol. 19, No. 3, dated Mar. 10, 2009.

* cited by examiner

Ambient heat from air

INTEGRATION OF AN ENERGY STORAGE DEVICE WITH A SEPARATE THERMAL PROCESS

FIELD OF THE INVENTION

The present invention relates to the integration of thermal and thermodynamic energy storage devices, and particularly cryogenic energy storage devices, with other co-located thermal processes that generate heat or cold and may benefit, including economically, from the transfer of heat or cold to or from the energy storage device.

BACKGROUND OF THE INVENTION

Electricity transmission and distribution networks (or grids) must balance the generation of electricity with the demand from consumers. This is normally achieved by modulating the generation side (supply side) by turning power stations on and off, and running some at reduced load. As most existing thermal and nuclear power stations are most efficient when run continuously at full load, there is an efficiency penalty in balancing the supply side of the electricity system in this way. The expected introduction of significant intermittent renewable generation capacity, such as wind turbines and solar collectors, to the networks will further complicate the balancing of the grids, by creating uncertainty in the availability of parts of the generation fleet. A means of storing energy during periods of low demand for later use during periods of high demand, or during low output from intermittent generators, would be of major benefit in balancing the grid and providing security of supply.

Power storage devices operate on a highly intermittent basis when there is a shortage of generating capacity on the transmission or distribution network. This can be signaled to the storage device operator by a high price for electricity in the local power market or by a request from the organisation responsible for the operating of the network for additional capacity. In some countries, such as the United Kingdom, the network operator enters into contracts for the supply of back up reserves to the network with operators of power plants with a rapid start capability. Such contracts can cover months or even years but typically the time the power provider will be operating (generating power) is very short. This is illustrated in FIG. 1 which shows a typical operating profile for a storage device.

WO 2007-096656 A1 and GB1100569.1 disclose Cryogenic Power Storage Devices (CPSDs) that utilize cryogenic fluids, such as liquid nitrogen or liquid air, as storage media to store energy as thermal potential energy for providing power storage and network support services to electricity transmission and distribution networks. The Cryogenic Energy System (CES) described in WO 2007-096656 A1 is a first type of Cryogenic Power Storage Device (CPSD) and is a fully integrated storage device that requires only electricity and, optionally, heat as an input. The cryogenset described in GB1100569.1 is another type of Cryogenic Power Storage Device (CPSD) and is a simplified storage/power generation device that uses cryogenic fluid manufactured by an industrial gas liquefaction plant remote from the cryogenset, which is delivered to the cryogenset site by either pipeline or tanker. Both CPSDs described in the above mentioned patent applications benefit from receipt of low grade waste heat (hot thermal energy) from a co-located process. In addition, both devices produce low temperature cold thermal energy (cold energy) that may be of benefit to other users requiring cold e.g. air conditioning (offices); cooling (such as a data centre); freezing or refrigeration (such as a food processing factory).

However, CPSDs only operate on an intermittent basis, such as when there is high consumer demand or low generation from intermittent renewables, and typically for 250 to 1000 hours per year, and may be as low as <100 hours per year depending on the application. This poses at least three issues for the integration of the CPSD with a co-located process, which typically operates on a continuous basis. Firstly, the demand for waste heat is intermittent and so the overall utilisation of waste heat, based on the peak thermal load, will be low and therefore inefficient. Secondly, the supply of cold energy will also be intermittent and difficult to efficiently utilize in a co-located process that operates on a continuous basis. Thirdly, the rate of heat transfer from the co-located process may be different from the rate of heat transfer required for optimum efficiency of the CPSD.

These issues are also relevant to the integration of other thermal processes with one another, wherein the thermal processes to be integrated have different supply and demand criteria. The intermittency of supply and/or demand may be on an hourly, daily, weekly, monthly, seasonal or annual basis.

Thermal stores may be integrated within an energy storage device, such as a cryogenic energy storage device, in order to optimise the thermal performance. Other energy storage technologies, examples of which include but are not limited to adiabatic compressed air energy storage and Ericsson cycle technologies, may also benefit from integration with waste heat and the use of thermal storage integrated either within the storage device and/or between the storage device and a co-located process.

SUMMARY OF THE INVENTION

The present invention provides a method for integrating a first thermal process and a second thermal process, wherein the rate of heat transfer from the first thermal process is different from the rate of heat transfer to the second thermal process, the method comprising:

providing a first thermal store;

charging the first thermal store with first thermal energy from the first thermal process by transferring the first thermal energy to the first thermal store at a first rate of energy transfer; and discharging the first thermal store by transferring the stored first thermal energy from the first thermal store to components of the second thermal process at a second rate of energy transfer, wherein the second rate is different from the first rate.

The present invention allows for the provision of a method for integrating a first Cryogenic Power Storage Device (CPSD) with a second process, wherein the second process provides hot thermal energy and/or receives cold thermal energy, and wherein the demand and supply of thermal energy from the first and second processes are out of phase and have a different rate of heat transfer. This inequality in the demand and supply is, in many cases, caused by the second process operating continuously, or at least nearly continuously, or at a different time of day from the CPSD process.

The first thermal energy may comprise heat energy or cold energy.

The step of discharging the first thermal store may be carried out at a later time than the step of charging the first thermal store. The length of the delay is dependent on the application. If the method is being used to control peak demand for the co-located process, the charging and discharging may involve a regular daily demand pattern. However, for network applications, the delay may be more irregular.

The steps of charging and discharging the first thermal store may be carried out on continuous or intermittent bases.

The second thermal process or the first thermal process may include an energy storage device. The energy storage device may comprise a cryogenic energy storage device. Alternatively, the energy storage device may comprise an alternative thermal process, such as a compressed air energy storage device.

The second process may be co-located with the first process. If the second process comprises a CPSD, the first process may be, for example, thermal power stations and industrial processes such as steelworks and chemical manufacturing plants. The first thermal process may comprise direct heating of the thermal store by means of a heating device powered by a source or sources of intermittent renewable energy.

A power storage device, by its nature, operates intermittently, i.e. when there is a high demand for power from the network and so power prices are high, or when there is danger of the network failing and additional support is required. This intermittency of operation may be on an hourly, daily, weekly, monthly, seasonal or annual basis. There is, therefore, a substantial difference in the optimal rate of heat transfer between the first CPSD process and the second co-located process(es).

The present inventors have discovered that by installing a thermal store between the two processes, the receipt and supply of thermal energy can be better managed to improve the overall performance of the two systems. In particular, as the CPSD requires heat and delivers cold energy at typically over 20 times the rate of a continuous co-located process of similar energy capacity, a thermal store is required to optimise the thermal performance.

The first rate may be at least five times the second rate. The first rate may be at least ten times the second rate. The first rate may be at least twenty times the second rate.

The thermal store may have any of the features disclosed in GB1013578.8. In particular, the thermal store may comprise an asymmetric thermal store. The thermal store may comprise:
 a first thermal mass;
 a second thermal mass; and
 a third thermal mass;
 wherein:
 the aspect ratios of at least two of the first, second and third thermal masses are different to one another; and
 an arrangement of conduits and valves configured to direct a heat transfer fluid to pass through a combination of one or more of the thermal masses,
 wherein the arrangement of conduits and valves is such that the thermal masses can be isolated from one another.

In a preferred embodiment, the arrangement of conduits and valves is configured to allow the heat transfer fluid (HTF) to be directed through:
 i) all of the first, second and third thermal masses, and alternatively
 ii) two of the first, second and third thermal masses, and alternatively
 iii) one of the first, second and third thermal masses.

The arrangement of conduits and valves may be such that the HTF can be directed through two of the first and second thermal masses in parallel and the third thermal mass in series, and alternatively through two of the first and second thermal masses in parallel.

The HTF may comprise a gas or a liquid. The HTF is used to either heat or cool the thermal mass.

A thermal mass is a substance which is capable of absorbing and giving off thermal energy.

The thermal energy storage device may comprise more than three thermal masses.

Each of the at least three thermal masses may comprise a single thermal cell or a plurality of thermal cells arranged in parallel with one another. When one or more of the thermal masses comprise a plurality of thermal cells, each thermal cell within a thermal mass may have the same or different mean cross-sectional areas. When a thermal mass comprises more than one thermal cell arranged in parallel with one another, the aspect ratio of the thermal mass is the ratio of the mean length of the thermal cells to the sum of the mean cross-sectional flow area of the thermal cells.

The first, second and third thermal masses may comprise solid particles and the diameter of the particles in at least two of the first, second and third thermal masses may be different to one another. Alternatively, the diameter of the particles in at least two of the first, second and third thermal masses may be the same as one another. When referring to the diameter of the particles, the mean equivalent spherical diameter of all particles within the thermal mass is meant.

Each thermal cell may comprise one or a combination of:
 i) a packed bed of solid particles through which the HTF can pass directly to carry thermal energy to and from the thermal energy storage device,
 ii) a packed bed of solid particles arranged around at least one conduit through which the HTF can pass,
 iii) a solid mass "matrix" including a plurality of channels through which the HTF can pass, or
 iv) a volume of phase change material.

When the first, second and third thermal masses comprise solid particles the thermal cell may comprise one, or a combination, of options i) and ii).

A phase change material is a material which is capable of storing and releasing energy by changing its state, for example from solid to liquid or liquid to gas and vice versa.

In option ii), the packed bed is isolated from the HTF by the at least one conduit.

In options i) and ii), the particles may be spherical or near spherical particles. The mean equivalent spherical diameter of the particles is preferably 1 to 25mm. Each thermal cell may include a plurality of solid particles having the same equivalent spherical diameters, or different equivalent spherical diameters. In addition or alternatively, each of the solid particles may be formed from different materials. The equivalent spherical diameters of the particles within each thermal cell may increase or decrease along the length of the thermal cell, from the inlet to the outlet. The material from which the particles within each thermal cell are formed may change along the length of the thermal cell.

The mean equivalent spherical diameter of the particles in one thermal cell may be different to, or the same as, those in another thermal cell. By varying the diameter of the particles between the thermal masses, the pressure drop/heat transfer characteristics of the thermal store can be optimised. Each thermal cell may have a circular, hexagonal, square, rhomboidal or any other shape cross-section that could easily be packaged into a support structure.

Each thermal mass may have a high thermal capacity to minimise the volume of the thermal mass.

Preferably, each thermal mass has a low thermal conductivity. Preferably, each thermal mass has a thermal conductivity less than 20 W/mK. More preferably, each thermal mass has a thermal conductivity less than 5 W/mK. It is desirable for each thermal mass to have a high thermal capacity to conductivity ratio. Preferably each thermal mass has $Cp*\rho/k > 180$ s/mm, more preferably each thermal mass has $Cp*\rho/k > 500$ s/mm, where Cp is the specific heat capacity, $\rho$ is the density, and k is the thermal conductivity of the particles comprising the thermal mass. Rock is a preferred material for the particles for each thermal mass. Preferably, the rock comprises granite, basalt or a manmade ceramic material. Alternatively, water in the form of ice could be used for the particles for each thermal mass. Preferably, the ice would not change its state across the operating range of the store.

The thermal energy storage device may further comprise a support structure to support the thermal masses. The support structure may further support at least a portion of the arrangement of conduits and valves.

The thermal energy storage device may further comprise insulation to insulate each thermal mass to minimise thermal losses from the thermal mass during storage.

The insulation may comprise thermally insulating material applied to the inside of the support structure and/or thermal breaks between a base of the thermal mass and the support structure. Thermal breaks are layers of low conducting material or air spaces that prevent the conduction of heat through the thermal break. Each thermal cell may be insulated on its inside. In a particular embodiment, the internal insulation comprises a double skin design in which the external support structure is isolated from the thermal mass or cells by a layer of insulation and a thin inner skin in contact with the thermal mass or cells. Alternatively, a spray coating of thermally insulating material may be applied to the inside of the support structure, or encapsulated insulation material may be fitted to the inside of the support structure.

The thermal energy storage device may further comprise insulation to insulate the arrangement of conduits and valves to minimise thermal losses from the storage device.

Isolating the thermal masses from one another helps to prevent convective losses from the thermal energy store during the storage phase between charging and discharging. In particular, a valve may be provided at the inlet and outlet of each thermal mass.

The arrangement of conduits and valves may be such that the HTF can be directed through two or more of the thermal masses in series.

The arrangement of conduits and valves may further be such that a first and second of the thermal masses are in parallel and a third of the thermal masses is in series with the first and second thermal masses.

The arrangement of conduits and valves may further be such that the HTF can be directed through two or more of the thermal masses in parallel.

The aspect ratio of each thermal mass is the ratio of the mean length of the thermal mass to the mean cross-sectional flow area of the thermal mass. Thermal masses with different aspect ratios may be provided by providing thermal masses of different mean cross-sectional area. Each of the thermal masses may have uniform cross-sectional areas along their length. Alternatively, each of the thermal masses may have varying cross-sectional areas along their length. For example, each of the thermal masses may have tapering cross-sections. When a thermal mass comprises more than one thermal cell, one or more of the thermal cells may have tapering cross-sections.

The aspect ratios of at least two of the first, second and third thermal masses may be different to one another. Preferably, the aspect ratios of all three of the thermal masses are different to one another.

Preferably, the mean cross-sectional area of the third thermal mass is smaller than the mean cross-sectional area of the second thermal mass. Preferably the mean cross-sectional area of the second thermal mass is smaller than the mean cross-sectional area of the first thermal mass.

Preferably the last thermal mass through which the HTF flows during final discharge has the smallest mean cross-sectional area of the three thermal masses. In this case, such a smaller flow area in the final part of the store during discharge allows the optimum thermal efficiency to be achieved.

The thermal energy storage device may comprise more than three thermal masses.

Each of the at least three thermal masses may comprise a single thermal cell or a plurality of thermal cells arranged in parallel with one another. Preferably, the first thermal mass comprises more thermal cells than the second thermal mass which, in turn, comprises more thermal cells than the third thermal mass. In an exemplary embodiment the first thermal mass comprises five thermal cells in parallel, the second thermal mass comprises four thermal cells in parallel, and the third thermal mass comprises a single thermal cell.

A thermal store of the type described above may also be of benefit within other energy storage technologies, examples of which include but are not limited to adiabatic compressed air energy storage and Ericsson cycle technologies. The thermal store may be integrated either within the storage device and/or between the storage device and a co-located process.

FIG. 2 shows a CPSD 100 integrated with a co-located thermal process 200 that donates heat, $Q_H$, and receives cold energy, $Q_C$, through thermal stores 300 and 400 respectively.

In addition, the present inventors have discovered that there are often several places in a co-located process where heat can be extracted. The use of the thermal store to optimise the extraction rates of thermal energy can, if applied correctly, deliver benefit to both processes.

The first thermal energy may be generated by one or more sources of thermal energy.

The first thermal energy may comprise heat energy, and the one or more sources of thermal energy may include one or more of:

steam condensate from a thermal or nuclear power station, flue gas from a thermal power station;

steam from a boiler;

ambient air;

ground (geological) heat; and sea, river or lake water.

The first source of thermal energy may comprise direct heating of the thermal store by means of a heating device powered by a source or sources of intermittent renewable energy.

For example, the first process may comprise a steam power plant. Many steam power plants reject significant quantities of low grade heat through the condensation of steam from the exhaust at the steam turbine. The extraction of heat before the condenser of the steam power plant for later use in the CPSD will reduce the parasitic load on the steam power plant by reducing the air flow required through the condenser. The integration of the CPSD with the steam power plant therefore benefits both processes: in supplying 'free heat' to the CPSD, and in reducing the parasitic load (often referred to as house load) on the steam power plant. An example of such a process is shown schematically in FIG. 3, in which the boiler 201 of the steam power plant vaporises and superheats the working fluid, which drives the turbine 202 of the steam power plant. Heat is extracted from the working fluid exhausted from the turbine by means of the heat exchanger 203. The working fluid is then condensed by the condenser 204 of the steam power plant facilitated by a powered air fan (shown within the dashed box 204). The condensed working fluid is then pumped back to the boiler 201 by means of the boiler feed pump 205. The heat extracted from the working fluid of the co-located process by heat exchanger 203 is stored in the thermal store 300 until required by the CPSD 100.

However, condensate systems in steam power stations often operate at 30 to 70° C., limiting the temperature to which the process gas can be heated in the CPSD and therefore the efficiency of the CPSD. Preferably, the heat supplied to the CPSD would be at least 100° C., more preferably at 200° C. Additional 'medium grade' heat $Q_f$ can be extracted from the flue gas 206 of the steam power plant, as shown in FIG. 3.

The present inventors have also discovered that it is beneficial to limit the amount of heat $Q_f$ that is extracted from the flue gas of a thermal power plant. If too much heat is extracted, the flue gas loses buoyancy and will not disperse correctly into the atmosphere which may result in high ground-level emissions close to the power plant. By extracting most of the required heat from the condensate system, only a small amount of energy needs to be taken from the flue, thus minimising the impact on the flue gas buoyancy and its consequences.

The method of the present invention may further comprise:
providing a second thermal store;
charging the second thermal store with second thermal energy from the second thermal process by transferring the second thermal energy to the second thermal store at a third rate of energy transfer; and
discharging the second thermal store by transferring the second thermal energy stored in the second thermal store from the second thermal store to components of a third thermal process at a fourth rate of energy transfer, wherein the fourth rate is different from the third rate.

The second thermal store may have any of the features described above. In particular, the second thermal store may comprise an asymmetric thermal store.

The second source of thermal energy may comprise direct heating of the thermal store by means of a heating device powered by a source or sources of intermittent renewable energy.

The third thermal process may be the same process as the first thermal process.

The step of discharging the second thermal store may be carried out at a later time than the step of charging the second thermal store.

The step of discharging the second thermal store may be carried out on a continuous or an intermittent basis.

The step of charging the second thermal store may be carried out on a continuous or an intermittent basis. The intermittency of charging may be on an hourly, daily, weekly, monthly, seasonal or annual basis.

The fourth rate may be at least five times the third rate. The fourth rate may be at least ten times the third rate. The fourth rate may be at least twenty times the third rate.

The second thermal energy may comprise heat energy or cold energy.

Where the first thermal process includes a cryogenic energy storage device, the first thermal energy may comprise cold energy liberated from the cryogenic energy storage device.

The second thermal process may include one or more of:
the air conditioning system for a building;
the refrigeration unit in a manufacturing process;
a gas liquefaction process; and
cooling of a data centre.

Where the second thermal process includes a CPSD and a second thermal store is provided, the second thermal energy may comprise cold energy liberated from the cryogenic energy storage device. In that case, the third thermal process may include one or more of:
the air conditioning system for a building;
the refrigeration unit in a manufacturing process;
a gas liquefaction process; and
cooling of a data centre.

BRIEF DESCRIPTION OF THE DRAWINGS

Embodiments of the present invention will now be described with reference to the figures in which.

DETAILED DESCRIPTION OF THE INVENTION

Although the devices of WO 2007-096656 A1 and GB 1100569.1 are different, both benefit from the receipt of hot thermal energy and provide, when operating, cold thermal energy and so, in the context of the present invention, are the same. For simplicity, the invention will be described through the integration with a cryogenset CPSD but the same inventive principles could equally apply to a CES.

Figure 1:
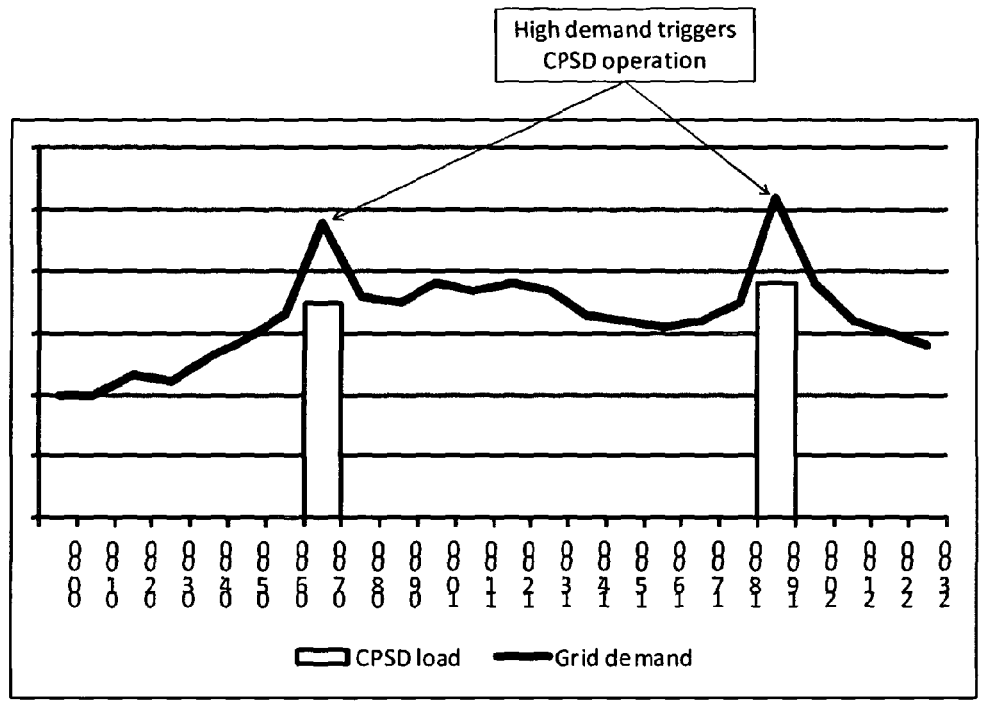
FIG. 1 shows the operating time of a typical power storage device.
Figure 2:
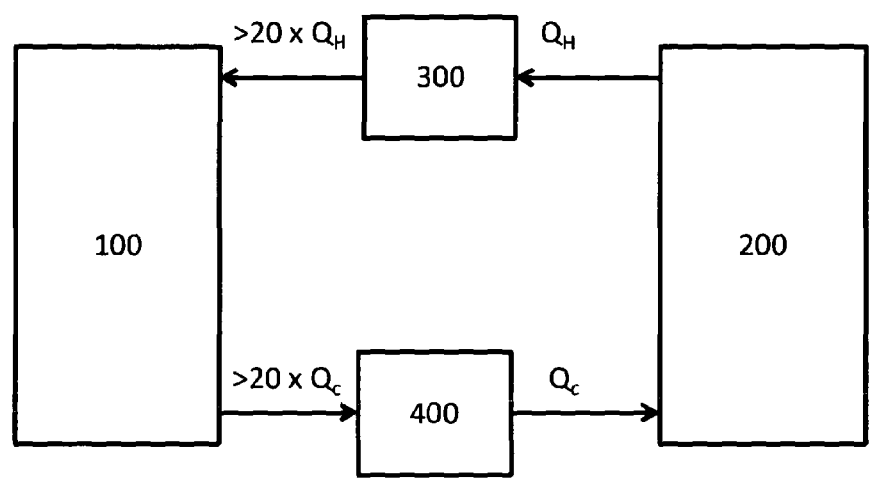
FIG. 2 shows a CPSD integrated with a co-located thermal process that donates heat and receives cold energy through thermal stores.
Figure 3:
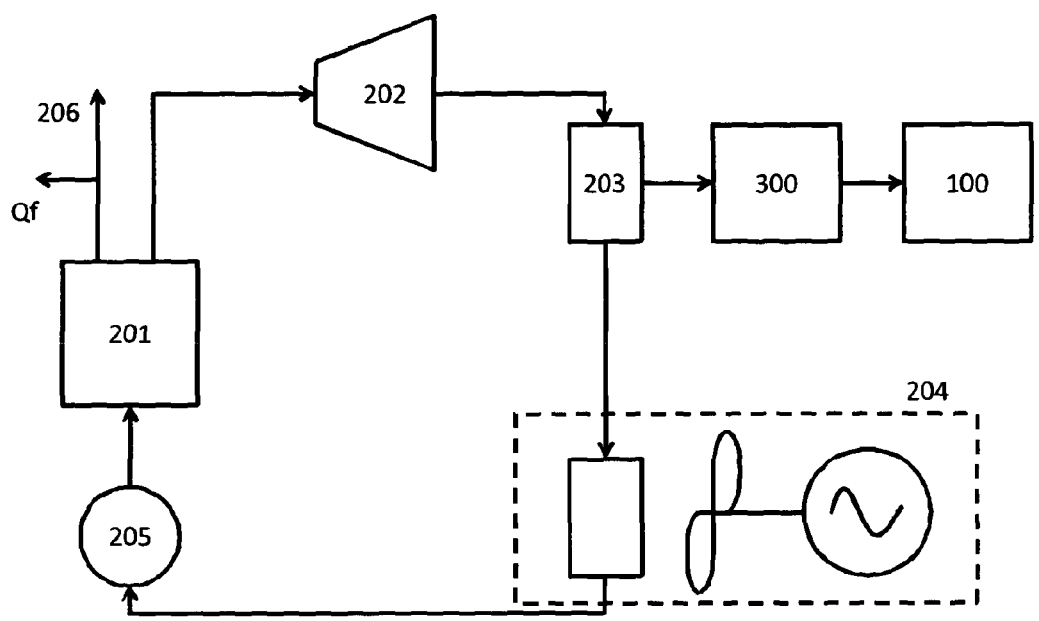
FIG. 3 shows an example of a CPSD integrated with a steam power plant.
Figure 4A:
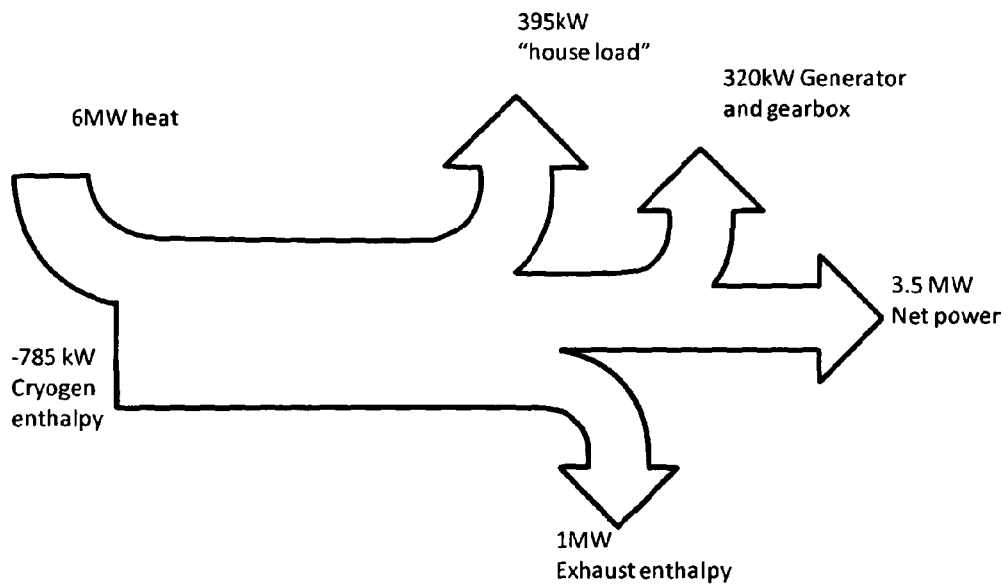
FIGS. 4a and 4b show Sankey diagrams for a cryogenset CPSD on a power and an energy basis, respectively.
Figure 4B:
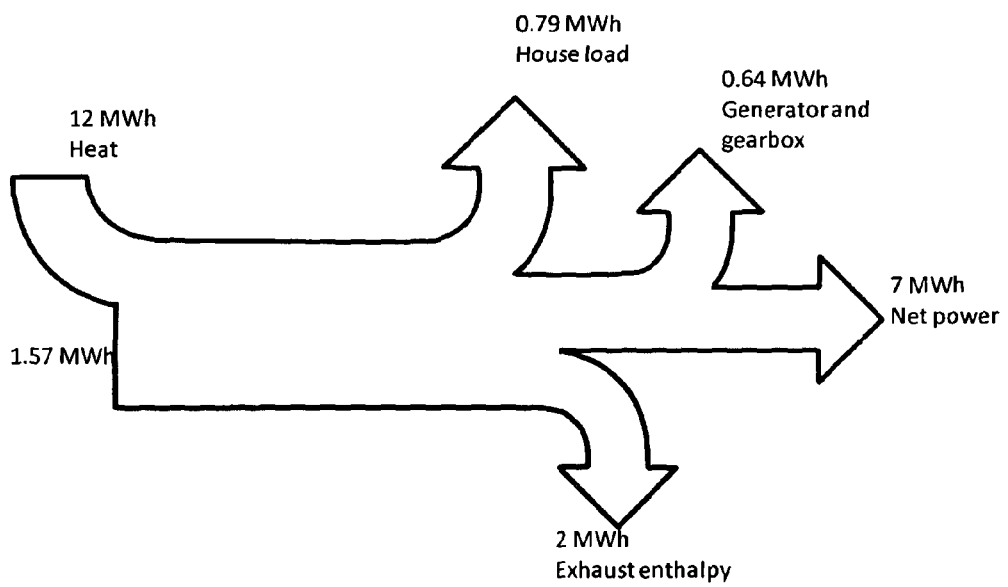
Figure 5A:
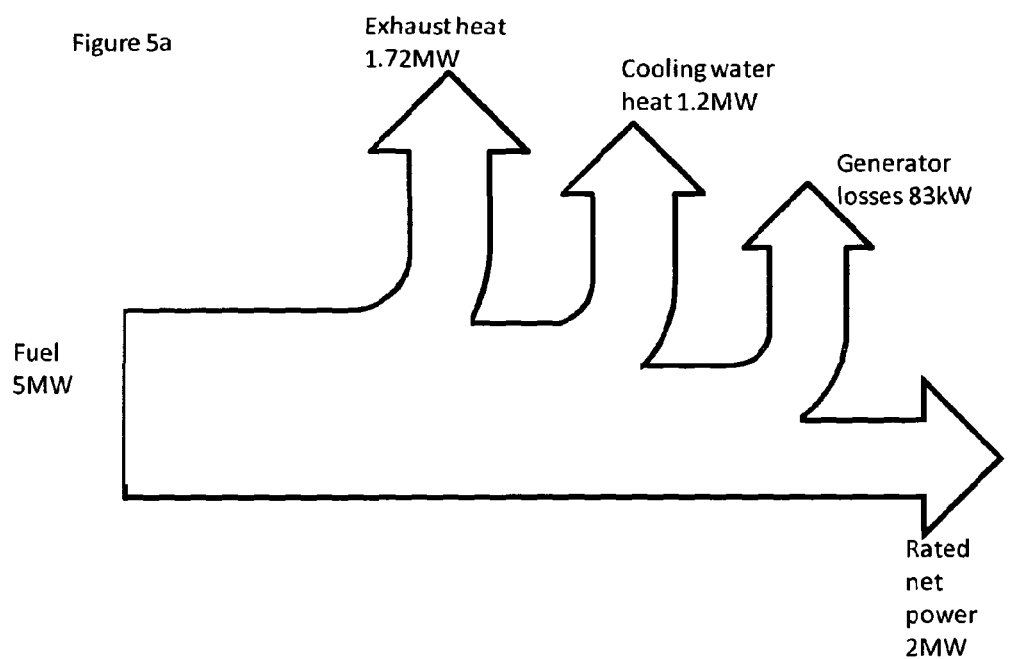
FIGS. 5a and 5b show Sankey diagrams for a gas engine on a power and an energy basis, respectively.
Figure 5B:
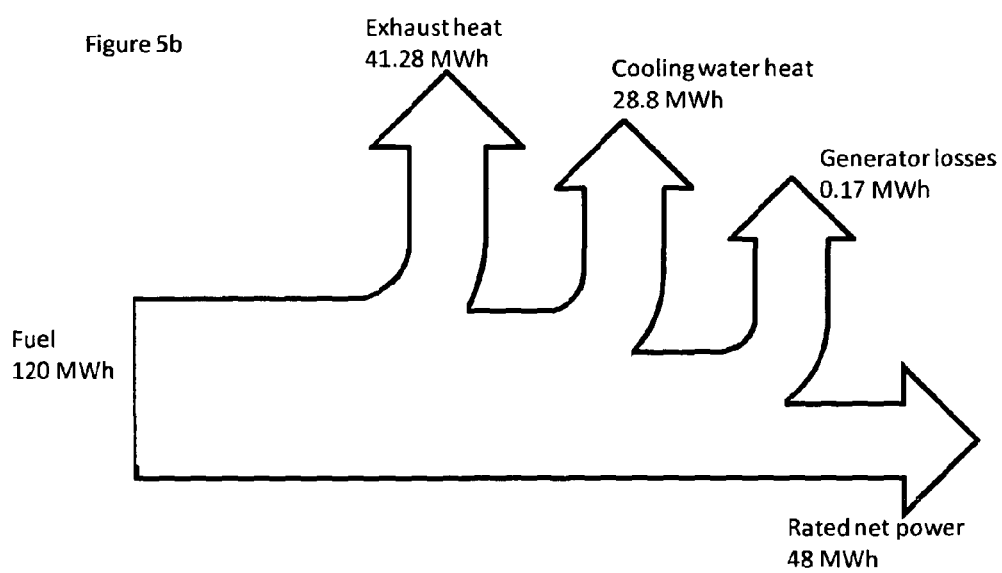

Using the example operating regime shown in FIG. 1, a typical Sankey diagram for a cryogenset on both a power basis (FIG. 4a) and an energy basis (FIG. 4b) is compared with a typical Sankey diagram for a 2 MW gas engine on both a power basis (FIG. 5a) and an energy basis (FIG. 5b). The 2 MW gas engine of FIGS. 5a and 5b operates on a base load, such as on a land fill gas site or mine gas site where the engines installed are typically of the given capacity. It is apparent that there is a mismatch between the thermal power requirements (FIGS. 4a and 5a) but that the energy requirements (FIGS. 4b and 5b) are better matched. In fact, it can be seen that, on an energy basis, a 2 MW gas engine could support three 3.5 MW cryogensets: each 3.5 MW cryogenset requires 12.5 MWh of heat to generate 7 MWh net power (FIG. 4b); the 2 MW gas turbine exhausts 41.28 MWh of heat (FIG. 5b); allowing for losses, on this basis the 41.28 MWh of exhaust heat from the gas turbine is sufficient for three 3.5 MW cryogensets, each producing 7 MWh of net power.

The present inventors have discovered that the installation of a thermal store between the two processes enables much better utilisation of the energy flow between the two processes and the deployment of more useful storage capacity. For example, the embodiment shown in FIGS. 4 and 5 provides for about an extra 10 MW of useful storage capacity for a given level of base load heat generation from the co-located process, which is a 2 MW gas engine in the example.

Figure 8A:
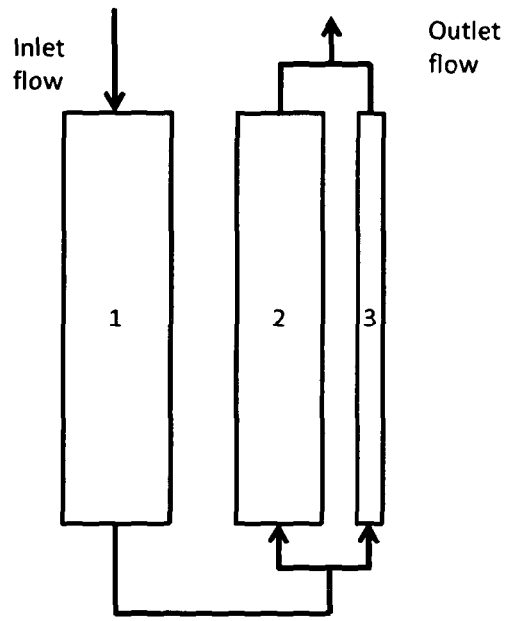
FIG. 8a) shows a thermal store that can be used in the method of the present invention (the device is shown during a charging phase)

However, although the introduction of the thermal store allows good utilisation of the energy flow between the two processes, the mismatch of the rate of the thermal charging and thermal discharging processes poses a particular challenge in the design of the store and in the integration of the store with the cryogenset and heat generating process. In particular, the thermal store must be capable of receiving heat at a rate of approximately 10% of the rate at which the store must supply heat to the cryogenset. This difference inevitably results in a significant difference in the flow rate of the heat transfer media used to transport the thermal energy between the two processes and the thermal store. A special type of 'asymmetric' thermal store is described above. The inventors have discovered that a thermal store having this asymmetric operation is invaluable when integrating an intermittent CPSD with a base load thermal source. FIGS. 8a) to 8c) show such an asymmetric thermal store. The thermal store includes three thermal masses of thermal storage material. The three thermal masses have different cross-sectional areas. The first thermal mass 1 has a larger mean cross-sectional area than the second thermal mass 2 which, in turn, has a larger mean cross-sectional area than the third thermal mass 3. Consequently, the device shown in FIGS. 8a), b) and c) has a variable flow area.

The device operates in the following manner:

Charging: During charging as shown in FIG. 8a) the HTF flow passes through the first thermal mass 1 and then through thermal masses 2 and 3. Thermal masses 2 and 3 are arranged in parallel. Thermal mass 1 is arranged in series with thermal masses 2 and 3. The cross-sectional area of thermal mass 1 is chosen such that the optimal heat transfer/pressure drop relationship is achieved during charging.

Figure 8B:
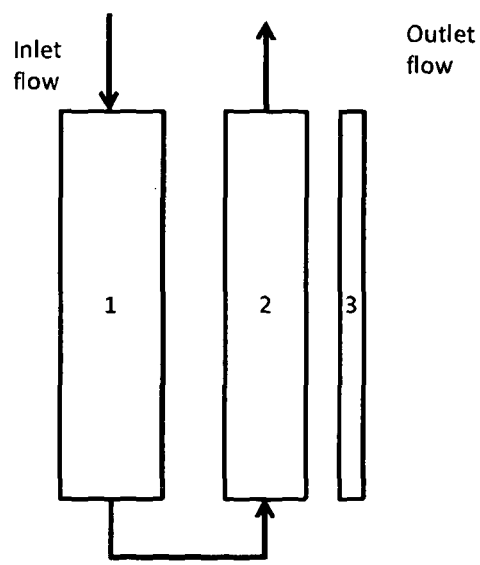
FIG. 8b) shows the thermal store of FIG. 8a) during an initial discharging phase.

Storage: The thermal masses are isolated from one another to prevent convective losses from the thermal energy store until the store is to be discharged. Initial Discharge: During initial discharge, as shown in FIG. 8b), the HTF flow initially passes through thermal mass 1 and then thermal mass 2, with thermal mass 3 being bypassed from the HTF flow circuit.

Figure 8C:
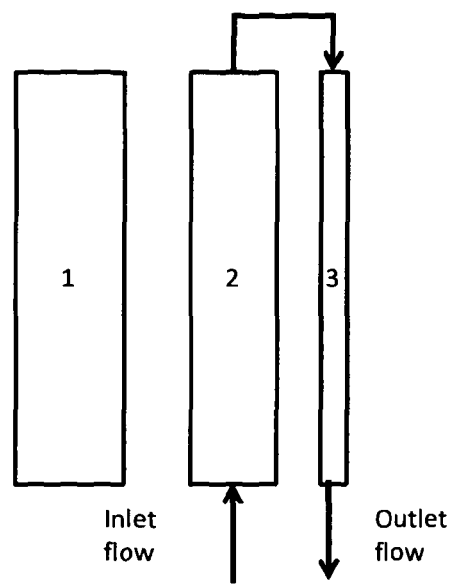
FIG. 8c) shows the thermal store device of FIG. 8a) during a final discharging phase.

Final Discharge: After undergoing initial discharge for a period of time, thermal mass 2 will be almost fully discharged and the outlet temperature of the HTF will start to rise. During final discharge as shown in FIG. 8c), thermal mass 1 is isolated from the circuit and the outlet flow from thermal mass 2 is directed through thermal mass 3. The cross-sectional flow area of thermal mass 3 is reduced relative to that of thermal masses 1 and 2 in order to minimise end-losses for the reduced discharge flow rate. Thermal mass 2 is thus fully discharged and only a small mass of the material in thermal mass 3 is not fully discharged. Thus, the amount of thermal energy that is not discharged from the thermal storage device is minimised. In some cases, it is not necessary to bypass thermal mass 1, thus simplifying the flow circuit if the pressure loss across thermal mass 1 is low.

Figure 6A:
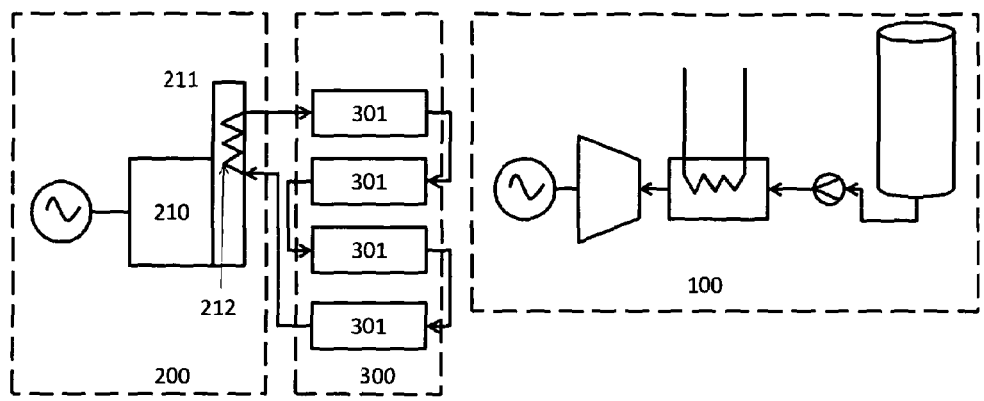
FIGS. 6a and 6b show configuration of a cryogenset CPSD, gas engine and thermal store.
Figure 6B:
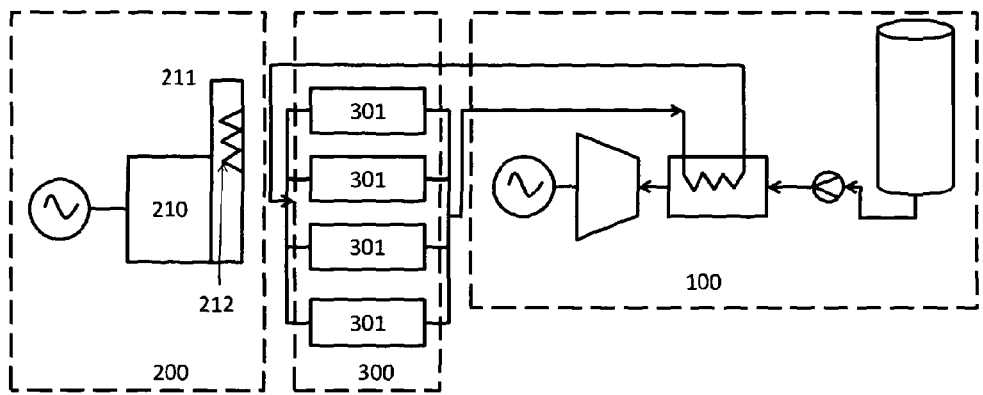

FIGS. 6a and 6b show diagrammatically how the gas engine 210 within a co-located process 200, a cryogenset 100 and a thermal store 300 should be configured to achieve optimal efficiency. In this embodiment the thermal store 300 is charged by heat exchange with the exhaust stack 211 of the gas engine, by means of the exhaust heat recovery heat exchanger 212. During the charging of the thermal store (FIG. 6a), as the heat flow and mass flow of the heat transfer fluid is low, the thermal storage cells 301, formed preferably, but not exclusively, from packed gravel beds, are arranged in series. In this configuration, the pressure drop across the thermal store 300 will be acceptable as the fluid mass flow will be low. End losses are minimised by the fact that the length to diameter ratio of the thermal store 300 is high as the thermal storage cells 301 are arranged in series. During discharge (FIG. 6b), also referred to as power recovery, the heat transfer rate and heat transfer fluid mass flow rate need to be higher than during charging; a series configuration of the store 300 would result in an unacceptably high pressure drop. Consequently, instead of arranging the thermal storage cells 301 in series, the thermal storage cells 301 are arranged in parallel, thus presenting a larger flow area to the heat transfer fluid and hence an acceptable flow velocity within the thermal storage cells 301 and therefore an acceptable pressure drop.

In the example described above, all of the thermal heat energy is supplied by the flue gas of a gas engine 210. However, the invention is applicable to other sources of thermal heat energy. In the case shown in FIGS. 6a and 6b, as the engine 210 is small (only 2 MW), it is not economically viable to install a continuous heat recovery device, such as a steam bottoming set or an organic Rankine cycle (ORC). Thermal energy is therefore available at 'medium grade', defined as greater than 100° C. but less than 250° C., in sufficient quantity for the CPSD 100. Larger power generating equipment such as Energy from Waste (EfW) plant, Combined Cycle Gas Turbine (CCGT) and larger coal or biomass fired steam plant, with an output of the order of 30 MW to 50 MW and higher, will often be fitted with additional turbine stages or heat recovery equipment to improve the overall efficiency of the plant. The thermal energy in the exhaust stack is much lower and more heat is available at low grade, defined as less than 100° C., for example from the steam condenser, than in the example of FIGS. 6a and 6b. The integration of the thermal plant with the CPSD can be further optimised by using heat from both sources. The inventors have discovered that low grade heat energy can supply 50% of the heat requirements for the preferred embodiment of a cryogenset. This reduces the amount of medium grade heat that is required, which may be available in a lower quantity. Table 1 summarises the amount of medium and low grade heat typically available from a number of candidate thermal processes as a percentage of the rated electrical generation capacity of the process:

TABLE 1

|  | Low Grade Heat | Medium Grade Heat |
| --- | --- | --- |
| Diesel or Gas Engine | 62% | 75% |
| Open Cycle Gas Turbine (OCGT) | 12% | 125% |
| Combined Cycle Gas Turbine (CCGT) | 70% | 10% |
| Energy From Waste Plant (EfW) | 195% | 30% |

From the above table, it is apparent that significantly more low grade heat is available than medium grade heat in the case of the CCGT and the EfW. In a preferred embodiment of the invention, medium grade heat can be stored in a thermal buffer store, and low grade heat can be taken concurrently from the thermal source during discharge, or power recovery, of the cryogenset. Such an arrangement allows a higher capacity cryogenset to be installed than would be possible without the use of a buffer thermal store.

In addition, the low grade heat required by the cryogenset may also be stored in a buffer thermal store. In such an arrangement, the use of the low grade heat can reduce the parasitic load (or house load) on the thermal source by providing a more effective means of rejecting heat from the condensers than when using an air cooled condenser or cooling tower. The efficiency of the thermal power plant can therefore be improved.

The low grade heat may not be taken from the thermal source on a continuous basis. Instead, the low grade heat may be taken from the thermal source during the time of day when the ambient temperature is high, such as during the afternoon, and the parasitic load to cool the condenser water is highest. Consequently, the maximum benefit of reducing the house load on the thermal plant can be achieved.

Figure 7:
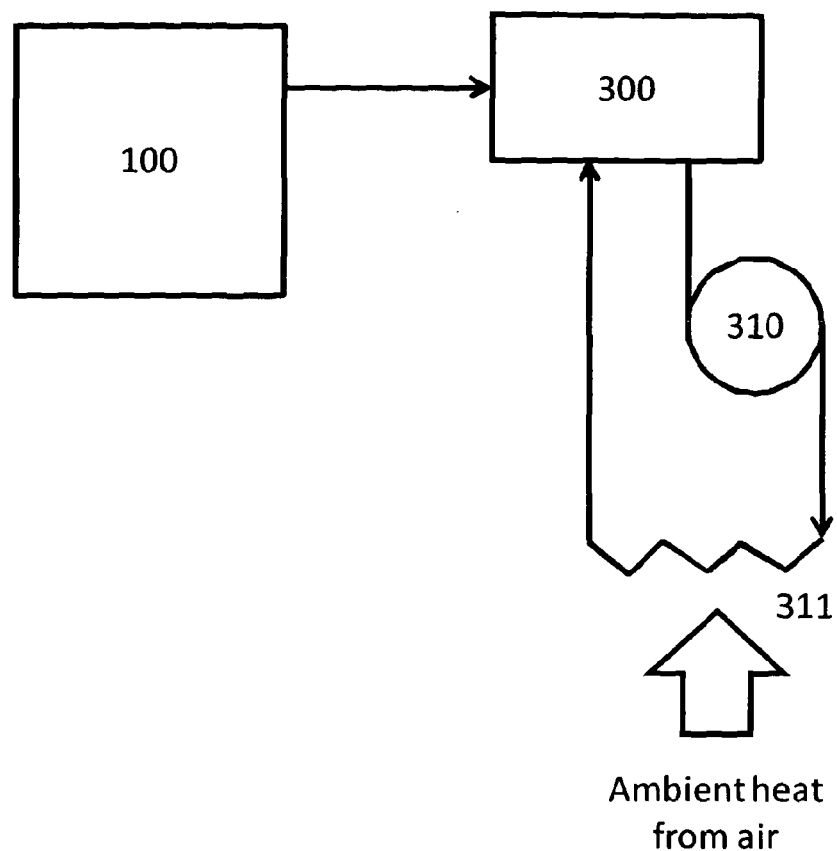
FIG. 7 shows a configuration of a cryogenset CPSD with a thermal store and an ambient vaporiser.

In some applications, the CPSD will not be located next to a source of heat. The use of ambient heat during power recovery, such as through an air warmed vaporiser alone, is in the view of the inventors impractical because the thermal energy requirements during power recovery are very high. If relying on ambient heat alone, the vaporiser fins would need to be spaced apart to avoid ice build up from moisture in the atmosphere, thus leading to a very large heat transfer area. In the view of the inventors, such a solution would be both expensive and would take up considerable ground area and would, therefore, not be cost effective. Alternatively, with the method of the present invention, a thermal store can be used between the ambient vaporiser and the cryogenset. The thermal store can be warmed using ambient heat at a low energy flow rate and a much smaller vaporiser. The thermal mass of the thermal store can then be used during the power recovery phase of the CPSD to warm up the cryogenic fluid to ambient temperature. A diagram of this embodiment of the invention is shown in FIG. 7 in which the CPSD 100 is integrated with a heat store 300 which is charged using ambient heat from air by means of circulating pump 310 and heat exchanger 311. In alternative embodiments the ambient heat could be supplied from the ground (geological heat), from a river or from the sea.

The inventors also note that both the Cryogenset and CES release considerable amounts of cold energy as 'high grade cold' (typically below −150° C.) and 'low grade cold' (typically between 0° C. and −150° C.). The high and low grade cold energy is released in large quantities over a short period of time. Many processes require cooling and consume considerable amounts of power in refrigeration and air conditioning plant. Examples of such processes are:

Data centres
Food storage warehouses
Supermarkets
Food processing factories
Telecommunication centres
Offices and commercial premises (for air conditioning)

The linking of a CPSD with such applications can be used to reduce or even negate the need for air conditioning and refrigeration equipment, thus saving on energy and capital costs. However, as the cold energy is released from the CPSD in a short period of time, the use of a cold buffer store is necessary in order to achieve the optimal performance from the integration of the two processes. The cold energy is then available to supply on a continuous basis to (for example) cool the electronics in a data centre or telecommunications centre. In other applications, such as air conditioning an office, it may be advantageous to draw cold energy from the cold thermal store on an intermittent basis, such as only when the office is open and there is a demand for cooling. The addition of the cold thermal store to the arrangement allows use of the cold energy to be time shifted and the rate of supply of cold to a final consumer to be changed independently from the rate of supply and time of supply by the CPSD.

It will be appreciated that the present invention has been described by way of example only, and that alterations or modifications may be made within the scope of the invention as defined in the following claims.

The invention claimed is:

1. A method for integrating a first thermal process and a second thermal process, wherein the rate of heat transfer from the first thermal process is different from the rate of heat transfer to the second thermal process, the method comprising:
   providing a first thermal store;
   managing receipt of first thermal energy by the first thermal store by charging the first thermal store with the first thermal energy from the first thermal process by transferring the first thermal energy to the first thermal store at a first rate of energy transfer; and
   managing a supply of the stored first thermal energy by the first thermal store by discharging the first thermal store by transferring the stored first thermal energy from the first thermal store to components of the second thermal process at a second rate of energy transfer, wherein the second rate is different from the first rate,
   wherein the first thermal store is an asymmetric thermal store comprising a first thermal mass, a second thermal mass and a third thermal mass, wherein aspect ratios of at least two of the first, second and third thermal masses are different to one another and wherein an arrangement of conduits and valves is such that the thermal masses can be isolated from each other; and
   wherein the steps of charging and discharging the first thermal store comprise passing a heat transfer fluid through a combination of one or more of the thermal masses.

2. The method of claim 1, wherein the step of discharging the first thermal store is carried out at a later time than the step of charging the first thermal store.

3. The method of claim 1 in which the step of discharging the first thermal store is carried out on a continuous or an intermittent basis.

4. The method of claim 1, in which the step of charging the first thermal store is carried out on a continuous or an intermittent basis.

5. The method of claim 1, in which the first rate is at least five times the second rate.

6. The method of claim 5, wherein the first rate is at least ten times the second rate.

7. The method of claim 6, wherein the first rate is at least twenty times the second rate.

8. The method of claim 1 wherein the first thermal energy comprises hot energy.

9. The method of claim 1 wherein the first thermal energy comprises cold energy.

10. The method of claim 1 in which the second thermal process includes an energy storage device.

11. The method of claim 10 wherein the energy storage device comprises a cryogenic energy storage device.

12. The method of claim 11 wherein the energy storage device comprises a compressed air energy storage device.

13. The method of claim 1 in which the first thermal energy is generated by one or more sources of thermal energy.

14. The method of claim 13 wherein the first thermal energy comprises heat energy, and the one or more sources of thermal energy includes one or more of:
   steam condensate from a thermal or nuclear power station,
   flue gas from a thermal power station;
   steam from a boiler;
   ambient air;

ground or geological heat; and sea, river or lake water.

15. The method of claim 1, further comprising:

providing a second thermal store;

charging the second thermal store with second thermal energy from the second thermal process by transferring the second thermal energy to the second thermal store at a third rate of energy transfer; and discharging the second thermal store by transferring the second thermal energy stored in the second thermal store from the second thermal store to components of a third thermal process at a fourth rate of energy transfer, wherein the fourth rate is different from the third rate.

16. The method of claim 15, wherein the third thermal process is the same process as the first thermal process.

17. The method of claim 15 wherein the step of discharging the second thermal store is carried out at a later time than the step of charging the second thermal store.

18. The method of claim 15 wherein the step of discharging the second thermal store is carried out on a continuous or an intermittent basis.

19. The method of claim 15, wherein the fourth rate is at least five times the third rate.

20. The method of claim 19, wherein the fourth rate is at least ten times the third rate.

21. The method of claim 20, wherein the fourth rate is at least twenty times the third rate.

22. The method of claim 15 wherein the second thermal energy comprises hot energy.

23. The method of claim 15 wherein the second thermal energy comprises cold energy.

24. The method of claim 1 where the first thermal process includes an energy storage device.

25. The method of claim 24, wherein the energy storage device comprises a cryogenic energy storage device.

26. The method of claim 24, wherein the energy storage device comprises an adiabatic compressed air energy storage device or an Ericsson cycle compressed air energy storage device.

27. The method of claim 25 wherein the first thermal energy comprises cold energy liberated from the cryogenic energy storage device.

28. The method of claim 27 wherein the second thermal process includes one or more of:

the air conditioning system for a building;

the refrigeration unit in a manufacturing process;

a gas liquefaction process; and cooling of a data centre.

29. The method of claim 11, further comprising:

providing a second thermal store;

charging the second thermal store with second thermal energy from the second thermal process by transferring the second thermal energy to the second thermal store at a third rate of energy transfer; and discharging the second thermal store by transferring the second thermal energy stored in the second thermal store from the second thermal store to components of a third thermal process at a fourth rate of energy transfer, wherein the fourth rate is different from the third rate.

30. The method of claim 29 wherein the second thermal energy comprises cold energy liberated from the cryogenic energy storage device.

31. The method of claim 1, wherein the first thermal store comprises an asymmetric thermal store.

32. The method of claim 15 wherein the second thermal store comprises an asymmetric thermal store.

33. The method of claim 30 wherein the third thermal process includes one or more of:

the air conditioning system for a building;

the refrigeration unit in a manufacturing process;

a gas liquefaction process; and cooling of a data centre.

34. A first thermal store for use with a first thermal process and a second thermal process, wherein a rate of heat transfer from the first thermal process is different from a rate of heat transfer to the second thermal process and wherein the first thermal store is an asymmetric thermal store comprising:

a first thermal mass, a second thermal mass; and a third thermal mass, wherein the aspect ratios of at least two of the first, second and third thermal masses are different to one another; and an arrangement of conduits and valves configured to direct a heat transfer fluid to pass through a combination of one or more of the thermal masses, wherein the arrangement of conduits and valves is such that the thermal masses can be isolated from each other; and wherein:

the first thermal store is arranged to be:

a) charged by first thermal energy from the first thermal process upon transfer of the first thermal energy to the first thermal store at a first rate of energy transfer thereby managing the receipt of the first thermal energy by the first thermal store; and b) discharged upon transfer of the stored first thermal energy from the first thermal store to components of the second thermal process at a second rate of energy transfer thereby managing the supply of the stored first thermal energy by the first thermal store, the second rate being different from the first rate.

* * * * *